United States Patent
Bhatia

(10) Patent No.: US 7,360,055 B2
(45) Date of Patent: Apr. 15, 2008

(54) TWO ADDRESS MAP FOR TRANSACTIONS BETWEEN AN X-BIT PROCESSOR AND A Y-BIT WIDE MEMORY

(75) Inventor: Sandeep Bhatia, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 409 days.

(21) Appl. No.: 10/776,760

(22) Filed: Feb. 10, 2004

(65) Prior Publication Data

US 2004/0162962 A1    Aug. 19, 2004

Related U.S. Application Data

(60) Provisional application No. 60/446,411, filed on Feb. 10, 2003.

(51) Int. Cl.
*G06F 12/06*    (2006.01)

(52) U.S. Cl. .................... 711/202; 711/201; 711/209

(58) Field of Classification Search .............. None
See application file for complete search history.

(56) References Cited

U.S. PATENT DOCUMENTS

| | | | | |
|---|---|---|---|---|
| 5,761,443 A | * | 6/1998 | Kranich | 710/100 |
| 6,694,392 B1 | * | 2/2004 | Haren | 710/65 |
| 6,750,781 B1 | * | 6/2004 | Kim | 340/825.69 |
| 7,000,045 B2 | * | 2/2006 | Holm et al. | 710/110 |

* cited by examiner

*Primary Examiner*—T Nguyen
(74) *Attorney, Agent, or Firm*—McAndrews Held & Malloy, Ltd.

(57) ABSTRACT

Presented herein are systems and methods for two address map for transactions between an X-bit processor and a Y-bit wide memory. A processor subsystem comprises a first address space, a second address space, and a bridge. The first address space stores data words of a first length. The second address space stores data words of a second length. The bridge performs one transaction after receiving a transaction with an address corresponding to the first address space and performs two transactions after receiving a transaction with the address corresponding to the second address space.

14 Claims, 3 Drawing Sheets

TWO ADDRESS MAP FOR TRANSACTIONS BETWEEN AN X-BIT PROCESSOR AND A Y-BIT WIDE MEMORY

RELATED APPLICATIONS

This application claims priority to Provisional Application for U.S. Patent, Ser. No. 60/446,411, entitled "Two address Map for Transactions Between an X-bit Processor and a Y-bit Wide Memory", filed Feb. 10, 2003, by Sandeep Bhatia, which is incorporated herein by reference.

BACKGROUND OF THE INVENTION

A common problem in application specific integrated circuits occurs when processors with different data word widths interact. For example, a 32-bit processor may interact with a 16-bit processor subsystem.

The 16-bit subsystem may include both 16 and 32 bit data words, and may also include a bridge between the wider bus of the 32-bit processor and the 16-bit processor. The data space of the 16-bit processor may contain both 16 and 32 bit wide variables. The 32 bit variables are stored in 16 bit memory as two consecutive 16 bit variables, each carrying the low and the high part of the 32 bit variable.

Typically, when the 32 bit processor wants to access the data space of the 16 bit processor to get a 16-bit variable, it would just put out the address and, depending on whether the system uses big Endian format, or little Endian format, the bridge would read from the appropriate location and return the data to the 32-bit processor.

There are several designs wherein a 32 bit processor can access the data space of the 16 bit processor to read 32 bit variables stored as two 16 bit variables. A simple form of reading the 32 bit word is having the 32 bit processor perform two 16 bit operations. However, the foregoing can have coherency issues as there can be a substantial delay between the two 16 bit operations. In the time between the two 16 bit transactions, the 16 bit processor may have changed one or both of the 16 bit words or another software thread running on the 32 bit processor may end up accessing this 16 bit pair. Thus, special Semaphore mechanism need to be employed between the processors and the threads to avoid these problems.

Processors can have, what are called byte enables. These signals correspond to the various bytes on the bus. Therefore, if the bus is 32 bits wide, there would be four byte enables. When the 32 bit processor seeks to access 32 bits, it would drive all the byte enables and the bridge could be designed to recognize that all the four bytes are required. The bridge can then perform dual 16 bit transactions in the internal data space and return the 32 bit word.

The bridge has to ensure that the 16 bit processor does not get between the two 16-bit transactions as that can possibly allow the 16 bit processor to change the value of either or both, thereby causing a faulty transaction.

The problem with this is the dependency on the availability of byte enables. Moreover, more and more systems are being designed in a manner that the dependency on byte enables is removed, because it makes the system Endian neutral.

Another way is to implement the capability to access 32 bit words is for the bridge to have a control bit that could be configured at the start of the transaction that indicates whether the next transaction with be 16 bit or a 32-bit transaction requiring the bridge to perform two 16 bit transactions.

The problem with this type of implementation is that extra effort has to be put to make the system software thread safe. Multiple processes running on the 32 bit processor may need to access the 16 bit processor data space. If one process begins a 32 bit transaction, it will have to first configure the bit to 32 bit mode, and then do a 32-bit read or write. In the meantime, if another software thread wanting to use this may also come in between the flag setting and the actual transaction, potentially corrupting the flag as the next thread may want to do a 16-bit transaction, resulting in fault operation for the other thread.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein are systems and methods for two address map for transactions between an X-bit processor and a Y-bit wide memory.

In one embodiment, there is presented a processor subsystem for transacting data. The processor subsystem comprises memory that is mapped to a first address space and a second address space, and a bridge. The first address space stores data words of a first length. The second address space stores data words of a second length. The bridge performs one transaction after receiving a transaction with an address corresponding to the first address space and performs two or more transactions after receiving a transaction with the address corresponding to the second address space.

In another embodiment, there is present a method for transacting data. The method comprises receiving a transaction for a target address; performing one transaction if the target address corresponds to a first address space; and performing two or more transactions if the target address corresponds to a second address space.

In another embodiment, there is presented a circuit for transacting data. The circuit comprises a processor subsystem and a processor. The processor subsystem comprises a memory that is mapped to a first address space and a second address space, and a bridge. The bridge performs one transaction after receiving a transaction with an address corresponding to the first address space and performs two or more transactions after receiving a transaction with the address corresponding to the second address space. The processor requests transactions from the processor subsystem.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
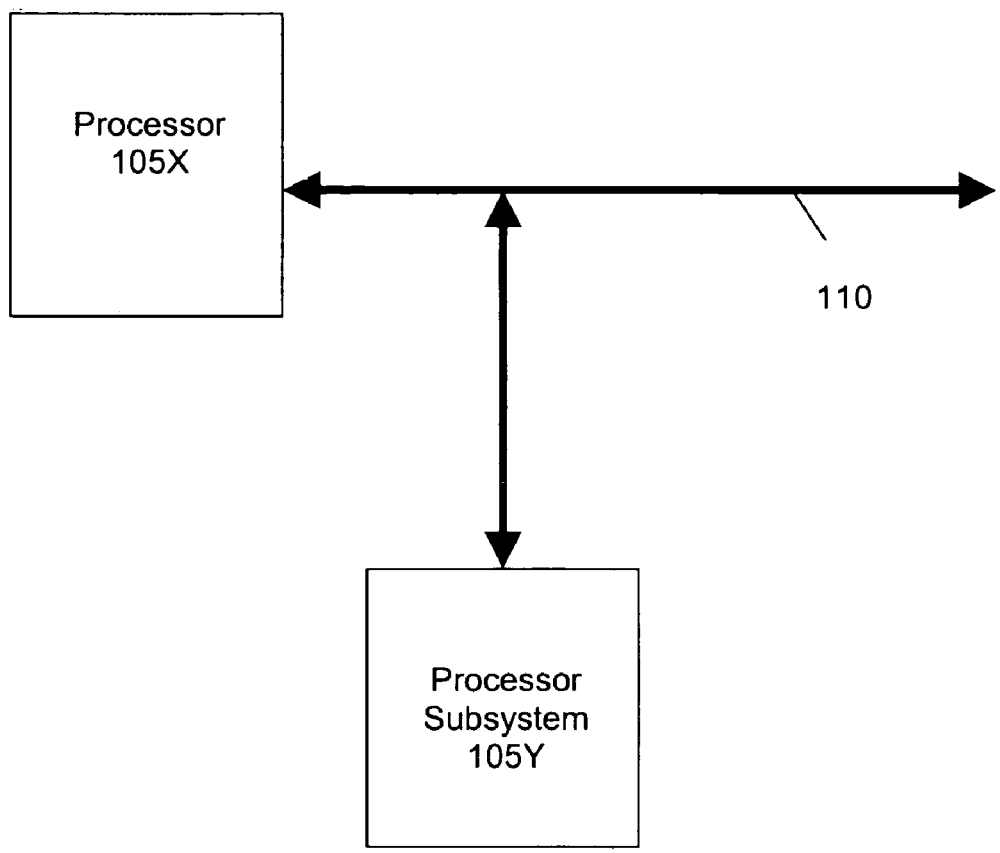
FIG. 1 describes an exemplary system wherein the present invention can be practiced.

Referring now to FIG. 1, there is illustrated a block diagram describing an exemplary circuit wherein the present invention can be practiced. The circuit comprises a processor 105X, a processor subsystem 105Y, and a bus 110. The processor 105X operates on X-bit data words while the processor subsystem 105Y operates on Y-bit data words, wherein X>Y, and wherein both X and Y are integer powers of two. For example, in an exemplary case, the processor 105X can operate on 32-bit words, while the processor subsystem 105Y can operate on 16 bit words.

The bus 110 comprises a X bit bus and allows the processor 105X to access the processor subsystem 105Y. The access can include both reads and writes. Additionally, the accesses can either by X-bit or Y-bit.

Figure 2:
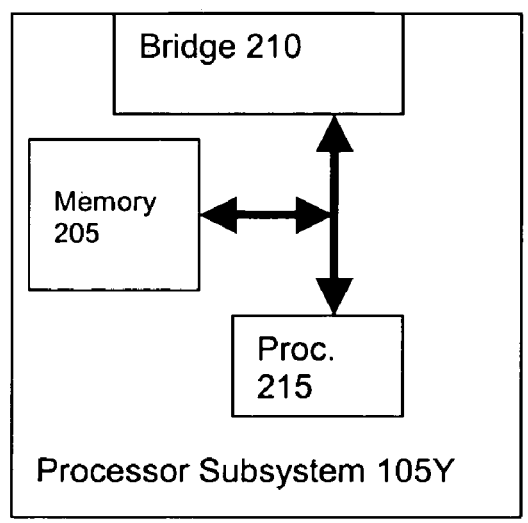
FIG. 2 describes an exemplary processor in accordance with an embodiment of the present invention.

Referring now to FIG. 2, there is illustrated a block diagram describing the processor subsystem 105Y in accordance with an embodiment of the present invention. The processor subsystem 105Y comprises memory mapped to two address spaces as viewed by the processor 105X, a bridge 210, and a processor 215.

One address space is associated with Y-bit transactions while the other address space is associated with the X bit transactions. Accesses by the processor 105Y and 105X to the memory using one of the address spaces are Y-bits while accesses by the processor 105X to the memory using the other of the address spaces are X-bits.

In an exemplary embodiment, the address spaces can have the addresses that have the same least significant bits, but a differ by the most significant bits. For example, one address space can be 0x0F00 through 0x0FFF, while the other address space is 0x1F00 through 0x1FFF. Where the address spaces 205X and 205Y have addresses that have the same least significant bits, but differ by the most significant bits, the most significant bits of the address can be used to indicate to the processor subsystem 105Y, whether the transaction is X bit or Y bit.

When the processor 105X seeks to access the memory 205, the processor 105X will send the address of the location onto the bus 110 to processor subsystem 105Y. The address will either be in the first address space or the second address space. The transaction is either Y bit or X bit, depending on whether the address is in the first address space or the second address space. Where the transaction is Y bit and the address is in the first address space, an address decode logic in the bridge 210 responds by having the bridge perform only one Y bit transaction internally. When the transaction is X bit, the address is in the second address space, and address decode logic in the bridge 210 responds by having the bridge internally perform two or more Y bit transactions back to back and complete the X bit transfer. The number of transactions is equivalent to the ratio between X and Y. Accordingly, there are no coherency issues, and the software on processor 105X is thread safe.

It is noted that on for a Y bit read transaction, where only Y bits are read, the X-Y most significant bits on the bus 110 are loaded with zeroes by the bridge 210. In a Y bit write transaction, the bridge 210 can be configured to only write the Y least significant bits received on the bus 110.

Figure 3:
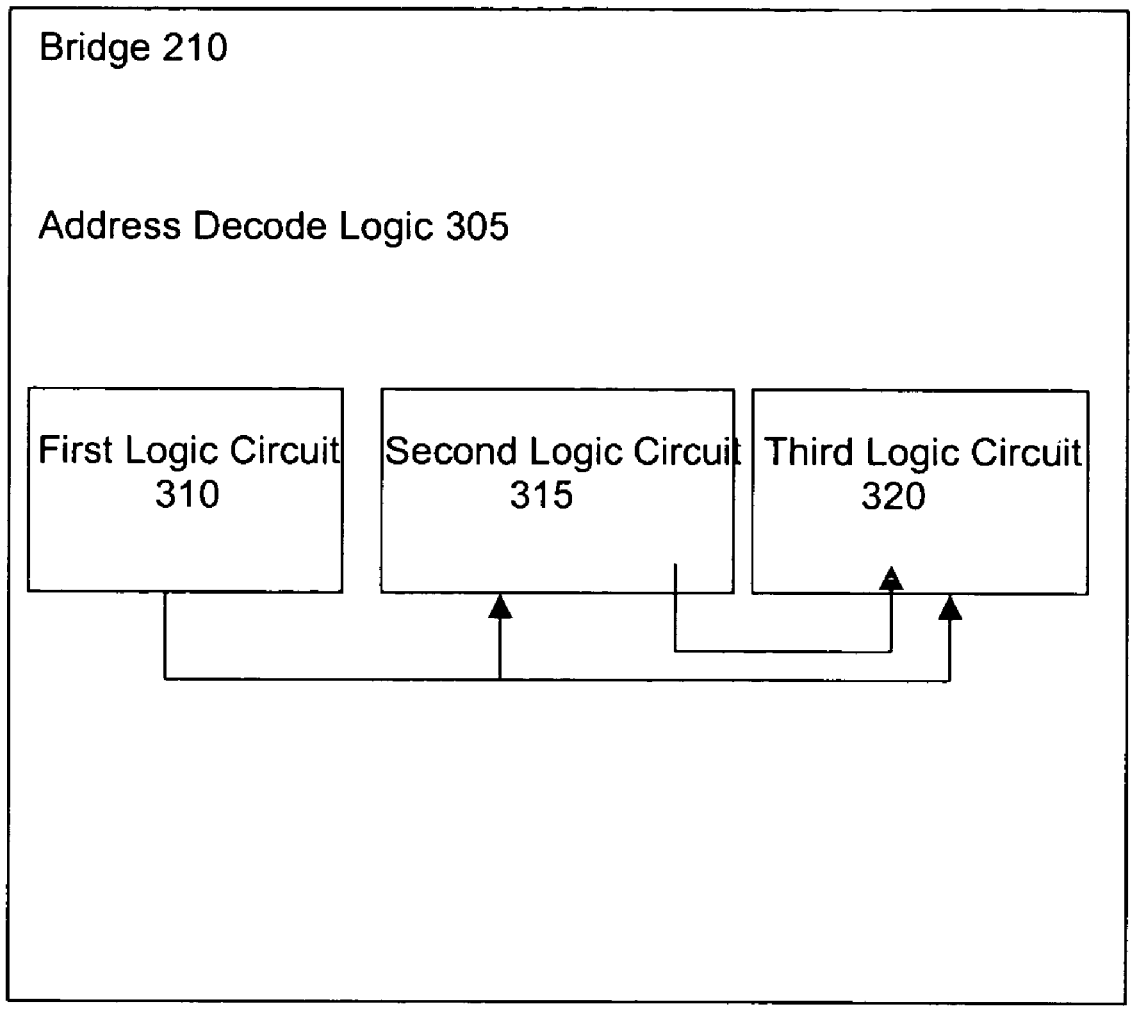
FIG. 3 is a block diagram describing the processor in accordance with an embodiment of the present invention.

Referring now to FIG. 3, there is illustrated a block diagram describing an exemplary bridge 210. The bridge 210 comprises address decode logic 305 for decoding an address and fetching the contents from the address. The address decode logic 305 decodes an address and determines whether the address corresponds to the first address space that is associated with Y bit transactions or the second address space that is associated with X bit transactions.

A first logic circuit 310 within the address decode logic 305 decodes the address. A second logic circuit 315 within the address decode logic 305 receives the decoded address and determines whether the address is in the first address space that is associated with Y bit transactions or the second address space that is associated with X bit transactions.

In an exemplary case, where the address spaces have addresses that have the same least significant bits, but differ by the most significant bits, the second logic circuit 315 can input the most significant bits of the address and determine whether the transaction is X bit or Y bit. For example, where one address space is 0x0F00 through 0x0FFF, and the second address space is 0x1F00 through 0x1FFF, the second logic circuit 315 can make the determination based on the bit 12 (where bit 0 is the least significant) of the decoded address.

Where the decoded address corresponds to address space that is associated with X bit transactions, the second logic circuit 315 sets a control signal 317 transmitted to a third logic circuit 320.

The third logic circuit 320 receives the decoded address and the rest of the transaction from the processor 105X and either causes bridge 210 perform one transaction on the decoded address or to perform a transaction on the decoded address and another transaction on the X/Y−1 next addresses to the decoded address. Where the third logic circuit 320 receives a set control signal 317, the third logic circuit 320 causes the bridge 210 to perform a transaction on the decoded address and another transaction on the X/Y−1 next addresses to the decoded address. Where the third logic circuit 320 does not receive a set control signal 317, the third logic circuit 320 cause the bridge 210 to perform a transaction on just the decoded address.

Figure 4:
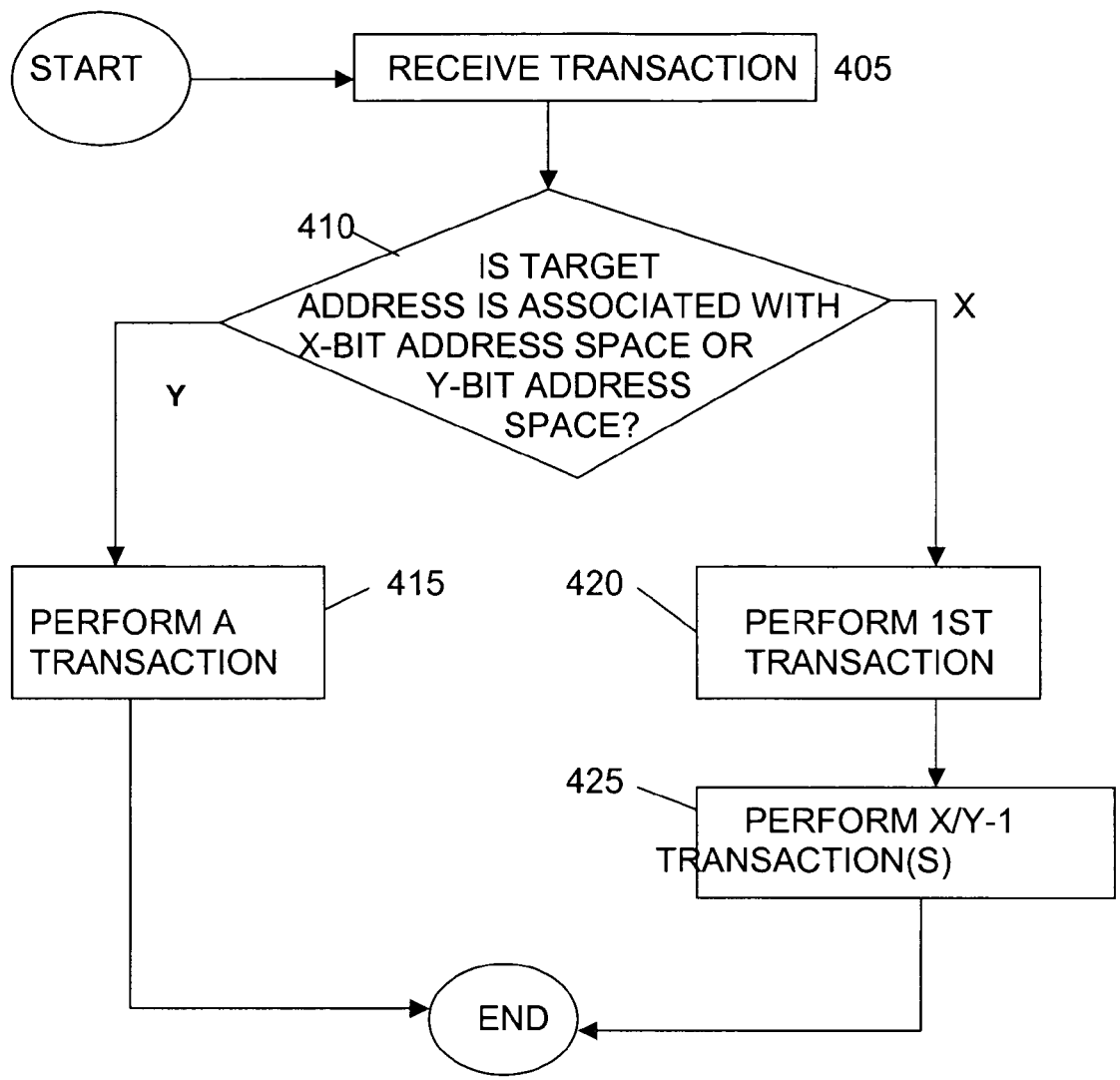
FIG. 4 is a flow diagram describing the operation of the processor in accordance with an embodiment of the present invention.

Referring now to FIG. 4, there is illustrated a flow diagram for performing X or Y bit transactions between an X bit processor and a Y bit processor subsystem. At 405, the X bit processor 105X issues either a transaction to a target address via the bus 110 to processor subsystem 105Y. Depending on which address space the target address corresponds to(410), the transaction is X bit or Y bit.

If the target address corresponds to a particular one of the address spaces, e.g., a first address space, the transaction is Y bit and the address decode logic decodes and accesses the contents from the provided address (415) and the bridge 210 performs only one Y bit transaction internally. If the target address corresponds to another one of the address spaces, e.g., a second address space, the transaction is X bits and the address decode logic decodes and access the contents from the provided address (420) and the X/Y−1 next addresses (425). The bridge performs X/Y Y bit transactions back to back, internally, and completes the transfer to processor 105X.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A processor subsystem for transacting data, the processor subsystem comprising:
   a memory for storing data, the memory mapped to a first address space associated with data values with a first length and a second address space associated with data values with a second length; and
   a bridge for determining whether the address corresponds to a first address space or a second address space by examining a particular bit in the address and performing one transaction after receiving a transaction with an address corresponding to the first address space and for performing two or more transactions after receiving a transaction with the address corresponding to the second address space.

2. The processor subsystem of claim 1, wherein the bridge further comprises:
   address control logic for causing the bridge to perform one transaction after receiving a transaction with an address corresponding to the first address space and perform two or more transactions after receiving a transaction with the address corresponding to the second address space.

3. The processor subsystem of claim 2, wherein the bridge further comprises address decode logic, and the address decode logic comprises:
   a first logic circuit for decoding the address; and
   a second logic circuit for determining if address corresponds to the first address space or the second address space.

4. The processor subsystem of claim 3, wherein the second logic circuit determines whether the address corresponds to the first address space or the second address space by examining the particular bit in the address.

5. Processor subsystem of claim 1, wherein the first length is 16 bits and the second length is 32 bits.

6. A method for transacting data, said method comprising:
   receiving a transaction for a target address;
   determining whether the target address corresponds to the first address space or the second address space by examining a particular bit in the address;
   performing one transaction if the target address corresponds to a first address space; and
   performing two transactions if the target address corresponds to a second address space.

7. The method of claim 6, further comprising:
   decoding the target address.

8. A circuit for transaction data, said circuit comprising:
   a processor subsystem comprising:
      memory for storing data, the memory mapped to a first address space associated with words of a first length and a second address space associated with words of a second length; and
      a bridge for receiving a transaction with an address, determining whether the address corresponds to the first address space or the second address space by examining a particular bit in the address and performing one transaction after receiving the transaction with the address corresponding to the first address space and for performing two or more transactions after receiving the transaction with the address corresponding to the second address space; and
   a processor for requesting transactions from the processor subsystem.

9. The circuit of claim 8, wherein the bridge further comprises:
   address control logic for causing the bridge to perform one transaction after receiving a transaction with an address corresponding to the first address space and perform two or more transactions after receiving a transaction with the address corresponding to the second address space.

10. The circuit of claim 9, wherein the bridge further comprises address decode logic, and the address decode logic comprises:
    a first logic circuit for decoding the address;and
    a second logic circuit for determining if address corresponds to the first address space or the second address space.

11. The circuit of claim 10 wherein the second logic circuit determines whether the address corresponds to the first address space or the second address space by examining the particular bit in the address.

12. The circuit of claim 8, wherein the first length is 16 bits and the second length is 32 bits.

13. The circuit of claim 8, further comprising:
    a bus for transmitting the transaction from the processor to the processor subsystem.

14. A processor subsystem for transacting data, the processor subsystem comprising:
    memory for storing data, the memory mapped to a first address space associated with data values of a first length and a second address space associated with data values of a second length; and
    a bridge for decoding an address by examining a particular bit within the address and performing one transaction when the address corresponds to the first address space and performing two or more transactions when the address corresponds to the second address space.

* * * * *